United States Patent
Aoki et al.

(10) Patent No.: US 12,386,074 B2
(45) Date of Patent: Aug. 12, 2025

(54) OBJECT DETECTION DEVICE

(71) Applicant: HOKUYO AUTOMATIC CO., LTD., Osaka (JP)

(72) Inventors: Takeshi Aoki, Osaka (JP); Akihito Yamamoto, Osaka (JP); Takahiro Kasahara, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 1120 days.

(21) Appl. No.: 17/295,779

(22) PCT Filed: Dec. 9, 2019

(86) PCT No.: PCT/JP2019/047992
§ 371 (c)(1),
(2) Date: May 20, 2021

(87) PCT Pub. No.: WO2020/129720
PCT Pub. Date: Jun. 25, 2020

(65) Prior Publication Data
US 2022/0018966 A1    Jan. 20, 2022

(30) Foreign Application Priority Data
Dec. 20, 2018 (JP) ................. 2018-237871

(51) Int. Cl.
*G01S 17/93* (2020.01)
*G01S 17/32* (2020.01)
*G01S 17/46* (2006.01)

(52) U.S. Cl.
CPC .............. *G01S 17/93* (2013.01); *G01S 17/32* (2013.01); *G01S 17/46* (2013.01)

(58) Field of Classification Search
CPC ....................................................... G01S 7/48
See application file for complete search history.

(56) References Cited

U.S. PATENT DOCUMENTS

| 2003/0164790 A1* | 9/2003 | Kurita .................... G01S 13/04 340/541 |
| 2014/0062759 A1* | 3/2014 | Morikawa ............... G01S 17/42 342/146 |

(Continued)

FOREIGN PATENT DOCUMENTS

| JP | H04-213705 A | 8/1992 |
| JP | H05-288847 A | 11/1993 |

(Continued)

OTHER PUBLICATIONS

Sep. 8, 2023 Office Action issued in Chinese Patent Application No. 201980077836.2.

(Continued)

*Primary Examiner* — Robert W Hodge
*Assistant Examiner* — Clara G Chilton
(74) *Attorney, Agent, or Firm* — Oliff PLC

(57) ABSTRACT

An object detection device can dynamically set an appropriate object detection region according to a state of an inherently unobstructive moving object. The device includes: an optical scanning unit configured to scan measurement light in a measurement space and to guide reflected light from a reflector; a reflector detection unit configured to detect reflector information including a distance from the device to the reflector, a reflected light intensity, and a scanning direction of the measurement light; a reference body identification unit configured to identify whether the reflector is a predetermined reference body, based on the reflector information; a region defining unit configured to define an object detection region along the reference body, based on the reflector information about the reference body; and an object determination unit configured to determine, as a target object, a reflector that is present in the region and that is not identified as the reference body.

7 Claims, 14 Drawing Sheets

(56) References Cited

U.S. PATENT DOCUMENTS

2015/0212202 A1* 7/2015 Mezger ................. G01S 17/88
356/4.01
2017/0242099 A1* 8/2017 Yamazaki .......... G08B 13/2491

FOREIGN PATENT DOCUMENTS

| JP | 2002215238 A | * | 7/2002 |
| JP | 2004-355551 A | | 12/2004 |
| JP | 2010216946 A | * | 9/2010 |
| JP | 2015-138026 A | | 7/2015 |
| JP | 2017-043461 A | | 3/2017 |
| JP | 2017-151569 A | | 8/2017 |
| WO | 03/075035 A1 | | 9/2003 |

OTHER PUBLICATIONS

Apr. 25, 2024 Office Action issued in Chinese Patent Application No. 201980077836.2.
Feb. 4, 2020 International Search Report issued in International Patent Application No. PCT/JP2019/047992.
Jun. 16, 2021 International Preliminary Report on Patentability issued in International Patent Application No. PCT/JP2019/047992.

* cited by examiner

| MODE SWITCHING / DETECTED POSITION | REGION RA: FIRST MODE<br><br>REGION RB: FIRST MODE | REGION RA: FIRST MODE<br><br>REGION RB: SECOND MODE | REGION RA: SECOND MODE<br><br>REGION RB: FIRST MODE | REGION RA: SECOND MODE<br><br>REGION RB: SECOND MODE |
|---|---|---|---|---|
| Ra | REGION RA: PRESENT<br>REGION RB: ABSENT<br>REGION RC: ABSENT | REGION RA: PRESENT<br>REGION RB: ABSENT<br>REGION RC: ABSENT | REGION RA: PRESENT<br>REGION RB: ABSENT<br>REGION RC: ABSENT | REGION RA: PRESENT<br>REGION RB: ABSENT<br>REGION RC: ABSENT |
| Rb | REGION RA: PRESENT<br>REGION RB: PRESENT<br>REGION RC: ABSENT | REGION RA: PRESENT<br>REGION RB: PRESENT<br>REGION RC: ABSENT | REGION RA: ABSENT<br>REGION RB: PRESENT<br>REGION RC: ABSENT | REGION RA: ABSENT<br>REGION RB: PRESENT<br>REGION RC: ABSENT |
| Rc | REGION RA: PRESENT<br>REGION RB: PRESENT<br>REGION RC: PRESENT | REGION RA: PRESENT<br>REGION RB: ABSENT<br>REGION RC: PRESENT | REGION RA: ABSENT<br>REGION RB: PRESENT<br>REGION RC: PRESENT | REGION RA: ABSENT<br>REGION RB: ABSENT<br>REGION RC: PRESENT |

Fig.14

OBJECT DETECTION DEVICE

TECHNICAL FIELD

The present invention relates to an object detection device that detects an object present in a measurement space.

BACKGROUND ART

Patent Literature 1 discloses an obstacle detection sensor for automatic guided vehicles that is capable of changing detection areas during traveling according to a traveling location. The obstacle detection sensor is mounted on the automatic guided vehicle. The obstacle detection sensor includes a non-contact distance measuring instrument, a detection area registration unit, a use pattern setting unit, and a determination unit.

The distance measuring instrument is configured to measure a distance to a detected object for each of predetermined angular ranges obtained by radially dividing a peripheral area of the instrument. The detection area registration unit is configured to register a plurality of detection area patterns that is defined by lines connecting a plurality of boundary points specified in the measurement range of the distance measuring instrument. The use pattern setting unit is configured to select and set a pattern to be used for each traveling section of the automatic guided vehicle, from among the plurality of detection area patterns set by the detection area registration unit. The determination unit is configured to output information indicating that an obstacle has been detected during traveling of the automatic guided vehicle, when a distance to a detected object measured by the distance measuring instrument for each predetermined angular range is within a detection area pattern set for the current traveling section.

Patent Literature 2 discloses a movable rack device including a group of parallel racks arranged in a rack arrangement direction. At least one of these racks is a movable rack that can move along the rack arrangement direction to create a rack aisle between the racks.

The movable rack device includes a controller to control movement of the movable rack based on a movement command input from an external device. When the controller receives a movement command that instructs a movable rack in a stopped state to move, but when there is an obstacle on a rack aisle in a traveling direction of the movable rack that is instructed by the command to move, the controller does not permit the movable rack to start moving. While the movable rack is moving, and when there is an obstacle within a region just ahead of the movable rack, the controller stops the movable rack.

When a rack aisle is existing, an obstacle detection range is set all over the rack aisle. On the other hand, when a rack is moving in a direction that narrows the rack aisle, the obstacle detection range is set in the vicinity of one of opposing racks. This is because, if the obstacle detection range is set all over the rack aisle while the rack is moving in the rack aisle narrowing direction, the obstacle detection device would detect the rack as an obstacle.

CITATION LIST

Patent Literature

Patent Literature 1: Japanese Unexamined Patent Application Publication No. 2002-215238

Patent Literature 2: Japanese Unexamined Patent Application Publication No. 2017-043461

SUMMARY OF INVENTION

Technical Problem

The obstacle detection sensor disclosed in Patent Literature 1 has appropriate detection area patterns set for respective traveling sections. However, the area pattern to be selected and used is set by input from the external use pattern setting unit. Additionally, these detection areas are defined on the assumption that there would be basically no obstacles in the detection area patterns. Hence, if an object that is inherently not an obstacle is present (which may be hereinafter referred to as "inherently unobstructive") in any of the detection areas, the obstacle detection sensor may erroneously detect such an object as an obstacle.

The obstacle detection device disclosed in Patent Literature 2 has an obstacle detection range only in the vicinity of the one of the opposing racks while the movable rack is moving in the direction that narrows the rack aisle. Accordingly, the obstacle detection device would not erroneously detect the inherently unobstructive movable rack as an obstacle. However, while the obstacle detection range is confined within the vicinity of the one of the opposing racks, the obstacle detection device cannot detect an obstacle that is present on the rack aisle but outside of the confined obstacle detection range.

In view of these problems, it is an object of the present invention to provide an object detection device that can dynamically set an appropriate object detection region according to a state of an inherently unobstructive moving object.

Solution to Problem

An object detection device for detecting an object in a measurement space in accordance with the present invention is made to achieve the above-mentioned object and includes following features. As a first feature, the object detection device in accordance with the present invention includes: an optical scanning unit configured to scan the measurement space by measurement light emitted from a light emission unit and to guide reflected light from a reflector for the measurement light to a light receiving unit; a reflector detection unit configured to detect reflector information, the reflector information including a distance from the object detection device to the reflector calculated based on physical characteristics of the measurement light and the reflected light, a reflected light intensity detected by the light receiving unit, and a scanning direction of the measurement light; a reference body identification unit configured to identify whether the reflector is a predetermined reference body, based on the reflector information detected by the reflector detection unit; a region defining unit configured to define an object detection region along the reference body, based on the reflector information about the reference body identified by the reference body identification unit; and an object determination unit configured to determine, as a target object, a reflector that is present in the object detection region defined by the region defining unit and that is not identified as the reference body by the reference body identification unit.

The reference body identification unit determines whether a reflector detected by the reflector detection unit is the reference body. When the reflector is determined as the reference body, an object detection region is dynamically defined along the reference body based on the reflector information about the reference body. This feature prevents the reference body from being erroneously detected as an object within the object detection region, i.e., as an obstacle, and also prevents the object detection region from being unnecessarily narrowly defined.

In addition to the first feature above, the object detection device in accordance with the present invention has a second feature that the object detection device is provided on a structure configured to move relative to the reference body so as to move toward and away from the reference body, and the object detection region is defined in a space between the object detection device and the reference body.

This feature enables identification of a relative position of the structure with respect to the reference body, and allows an object detection region to be dynamically defined in a space between the reference body and the object detection device, i.e., the structure.

In addition to the first or second feature above, the object detection device in accordance with the present invention has a third feature that the reference body identification unit is configured to identify a reflector present within a predetermined identification range that is narrower than a scanning range of the measurement light.

By making an identification range narrower than the scanning range of the measurement light, this feature can reduce the possibility of a reflector being erroneously detected as the reference body because of its reflected light intensity detected by the light receiving unit, and thus can increase object detection accuracy.

In addition to any of the first to third features above, the object detection device in accordance with the present invention has a fourth feature that the object detection region is given a predetermined offset toward the object detection device, based on a distance from the object detection device to the reference body.

Depending on characteristics of a reflective surface of the reference body, there may be an error in a distance detected by the reflector detection unit, which may result in erroneous detection that the reference body is present in the object detection region. The predetermined offset given toward the object detection device based on the distance to the reference body ensures that the reference body is excluded from the object detection region.

In addition to any of the first to fourth features above, the object detection device in accordance with the present invention has a fifth feature that the object detection region includes a predetermined fixed region that is defined in a portion thereof close to the object detection device, regardless of a distance from the object detection device to the reference body.

When the reference body comes near the object detection device, the fixed region prevents the object detection region from being unnecessarily narrowed.

In addition to any of the first to fifth features above, the object detection device in accordance with the present invention has a sixth feature that the reference body is composed of a planar body, and the object detection region at least includes a plane along a direction in which a plane of the reference body extends.

As the object detection region includes the plane along the direction in which the planar reference body extends, the plane of the reference body in its extending direction does not overlap the object detection region. Consequently, the plane of the reference body in its extending direction is prevented from being erroneously detected as an object.

In addition to any of the first to sixth features above, the object detection device in accordance with the present invention has a seventh feature that the region defining unit is configured to define a plurality of object detection regions that at least partially overlaps each other, and the object determination unit is configured to switch between a first determination mode and a second determination mode in a case where the target object is present in any one of the overlapping object detection regions, the object determination unit under the first determination mode determining that the target object is present in each one of the overlapping regions, the object determination unit under the second determination mode determining that the target object is present only in a particular one of the overlapping regions.

This feature enables determination of presence of a target object to be made only in a required region, which can reduce a calculation load for the determination processing. Additionally, this feature enables appropriate control according to individual situations.

In addition to any of the first to seventh features above, the object detection device in accordance with the present invention has an eighth feature that the object determination unit has a non-detection output mode. The object determination unit under the non-detection output mode determines, when the reference body identification unit is unable to identify the reference body in the measurement space, that the target object is present in the object detection region regardless of presence or absence of the reflector.

If the object detection device cannot identify the reference body in the measurement space, it is impossible to define an appropriate object detection region, and hence impossible to ensure reliable detection. To address this situation, the above-described feature can ensure safety by allowing the object determination unit to determine that a target object is present in the object detection region regardless of the presence or absence of the reflector.

As a ninth feature, an object detection device for detecting an object in a measurement space in accordance with the present invention includes: an optical scanning unit configured to scan the measurement space by measurement light emitted from a light emission unit and to guide reflected light from a reflector for the measurement light to a light receiving unit; a reflector detection unit configured to detect reflector information, the reflector information including a distance from the object detection device to the reflector calculated based on physical characteristics of the measurement light and the reflected light, a reflected light intensity detected by the light receiving unit, and a scanning direction of the measurement light; a region defining unit configured to define a plurality of object detection regions that at least partially overlaps each other; and an object determination unit configured to determine whether a target object is present in any one of the overlapping object detection regions, based on the reflector information detected by the reflector detection unit, wherein the object determination unit is configured to switch between a first determination mode and a second determination mode, the object determination unit under the first determination mode determining that the target object is present in each one of the overlapping regions, the object determination unit under the second determination mode determining that the target object is present only in a particular one of the overlapping regions.

Advantageous Effects of Invention

As described above, the present invention provides an object detection device that can dynamically set an appropriate object detection region according to a state of an inherently unobstructive moving object.

BRIEF DESCRIPTION OF DRAWINGS

FIGS. 4A to 4C illustrate a movable rack device with the object detection device built in.

FIG. 14 illustrates operations under a first determination mode and a second determination mode for determination by an object determination unit.

BEST MODE FOR CARRYING OUT THE INVENTION

Below a description will be given of an object detection device in accordance with the present invention.
[Configuration of the Object Detection Device]

Figure 1:
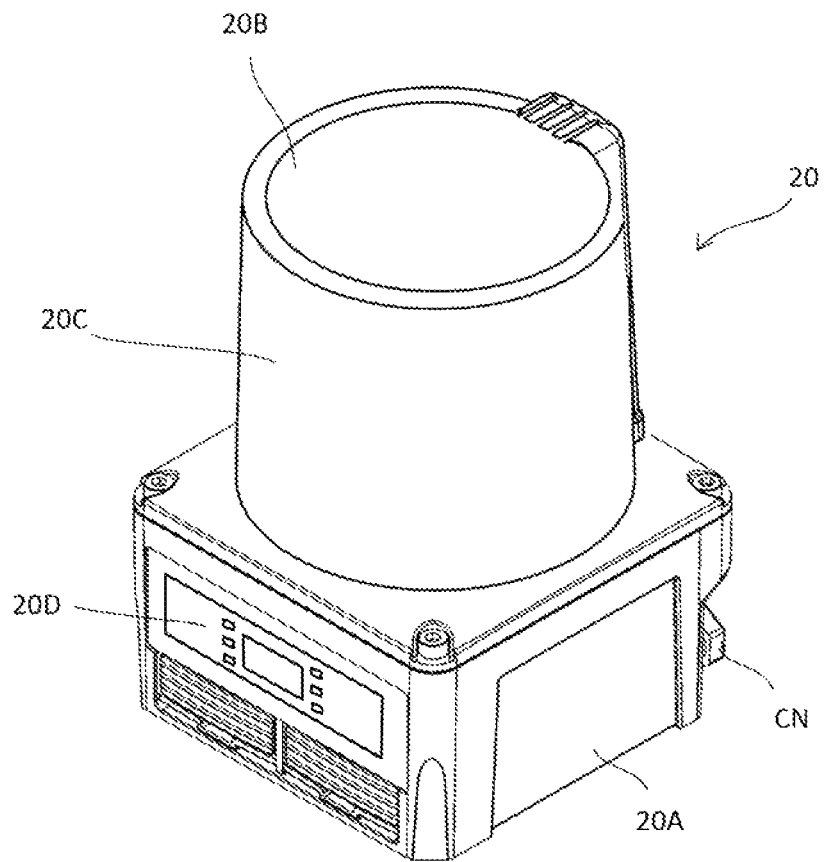
FIG. 1 illustrates an exterior of an object detection device.
Figure 2:
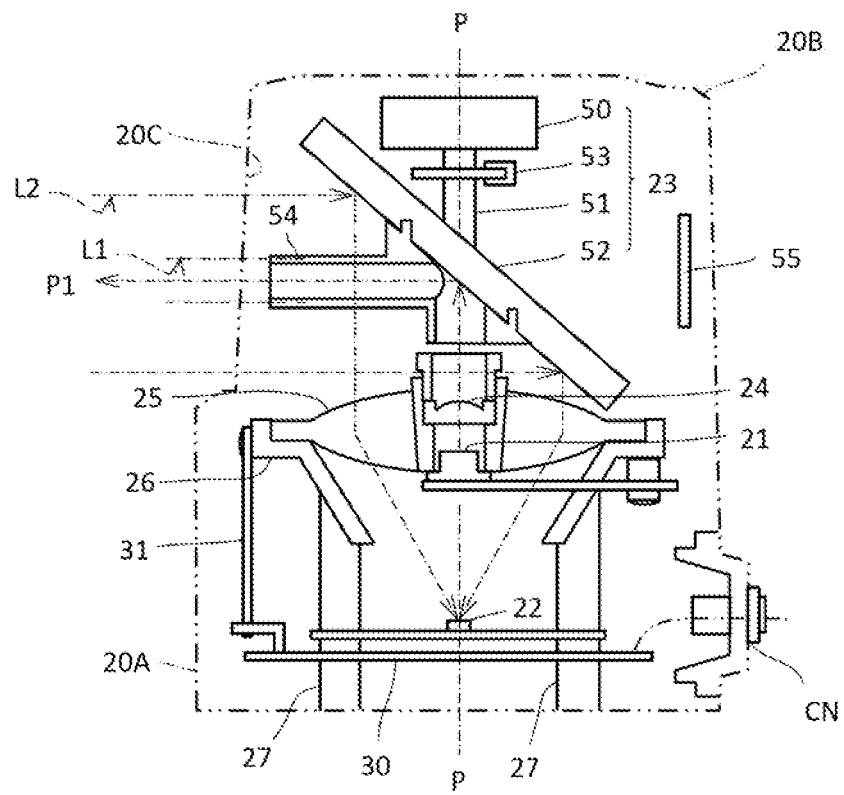
FIG. 2 illustrates an internal structure of the object detection device.

FIG. 1 illustrates an exterior of the object detection device 20, and FIG. 2 illustrates an internal structure of the object detection device 20. As shown in FIG. 1, the object detection device 20 includes a generally cuboid lower casing 20A and an upper casing 20B provided with a generally cylindrical optical window 20C. The lower casing 20A is provided with a signal connection CN and a display unit 20D.

As shown in FIG. 2, the casings 20A and 20B of the object detection device 20 accommodate a light emission unit 21, a light receiving unit 22, an optical scanning mechanism 23, a projection lens 24, a light receiving lens 25, and signal processing boards 30, 31. The optical scanning mechanism 23, the projection lens 24, and the light receiving lens 25 constitute an optical scanning unit that scans a measurement space by measurement light emitted from the light emission unit 21 and that guides reflected light from a reflector for the measurement light to the light receiving unit 22.

The optical scanning mechanism 23 is composed of a motor 50 located at an inner wall at the top of the upper casing 20B, and a deflection mirror 52 fixed to a rotary shaft 51 of the motor 50 such that the deflection mirror 52 can rotate together. The deflection mirror 52 is angled at 45 degrees relative to the rotary shaft 51. Also, the rotary shaft 51 is provided with an encoder 53 to measure a rotation speed of the motor 50. The encoder 53 serves as a scanning angle detection unit for the measurement light.

The light receiving lens 25 and the light receiving unit 22 are disposed at the opposite side of the deflection mirror 52 from the motor 50 and on an optical axis P that is coaxial with the rotary shaft 51 of the motor 50 arranged vertically. The light receiving lens 25 and the light receiving unit 22 are at different vertical positions. The light receiving lens 25 is formed at its center with a cylindrically bored opening. The light emission unit 21 is disposed at a lower end of the opening, and the projection lens 24 is disposed above the light emission unit 21.

A light guide unit 54 is secured to the deflection mirror 52 such that the light guide unit 54 rotates together with the deflection mirror 52. The light guide unit 54 separates a measurement light optical path L1 configured to guide measurement light deflected by the deflection mirror 52 to the measurement space, and a reflected light optical path L2 configured to allow deflection of reflected light by the deflection mirror 52 and thereby to guide the reflected light to the light receiving unit 22.

The light emission unit 21 is composed of an infrared laser diode mounted on a cantilevered board. Coherent measurement light emitted from the laser diode is shaped into parallel light by the projection lens 24 and enters the deflection mirror 52 along the optical axis P, where the light is deflected by 90 degrees. The deflected measurement light passes along an optical axis P1 through the inner region defined by the light guide unit 54 (i.e., the measurement light optical path L1), and is emitted to the measurement space through the optical window 20C.

A surface of an object present in the measurement space is irradiated with the measurement light. Apart of reflected light from the surface enters the optical window 20C along the optical axis P1 and passes through the outer region defined by the light guide unit 54 (i.e., the reflected light optical path L2) to be incident on the deflection mirror 52, where the light is deflected by 90 degrees. After deflected, the reflected light is focused by the light receiving lens 25 to be incident on the light receiving unit 22.

The light receiving lens 25 has a peripheral flange portion that is supported by a lens holder 26. The board constituting the light emission unit 21 is supported by the lens holder 26. Additionally, a plurality of legs 27 supporting the lens holder 26 also supports the signal processing boards 30, 31 and a board mounted with the light receiving unit 22.

The signal processing board 30 is provided with a controller 80 to control the object detection device 20. The signal processing board 31 is mounted with light-emitting diodes (LEDs) and a liquid crystal display element for display of various kinds of information on the display unit 20D. The signal processing board 30, the light emission unit 21, and the light receiving unit 22 are connected to each other with signal lines. A signal cable extends from the signal processing board 30, for signal exchange with external devices via the signal connection CN provided at the lower casing 20A.

Figure 3:
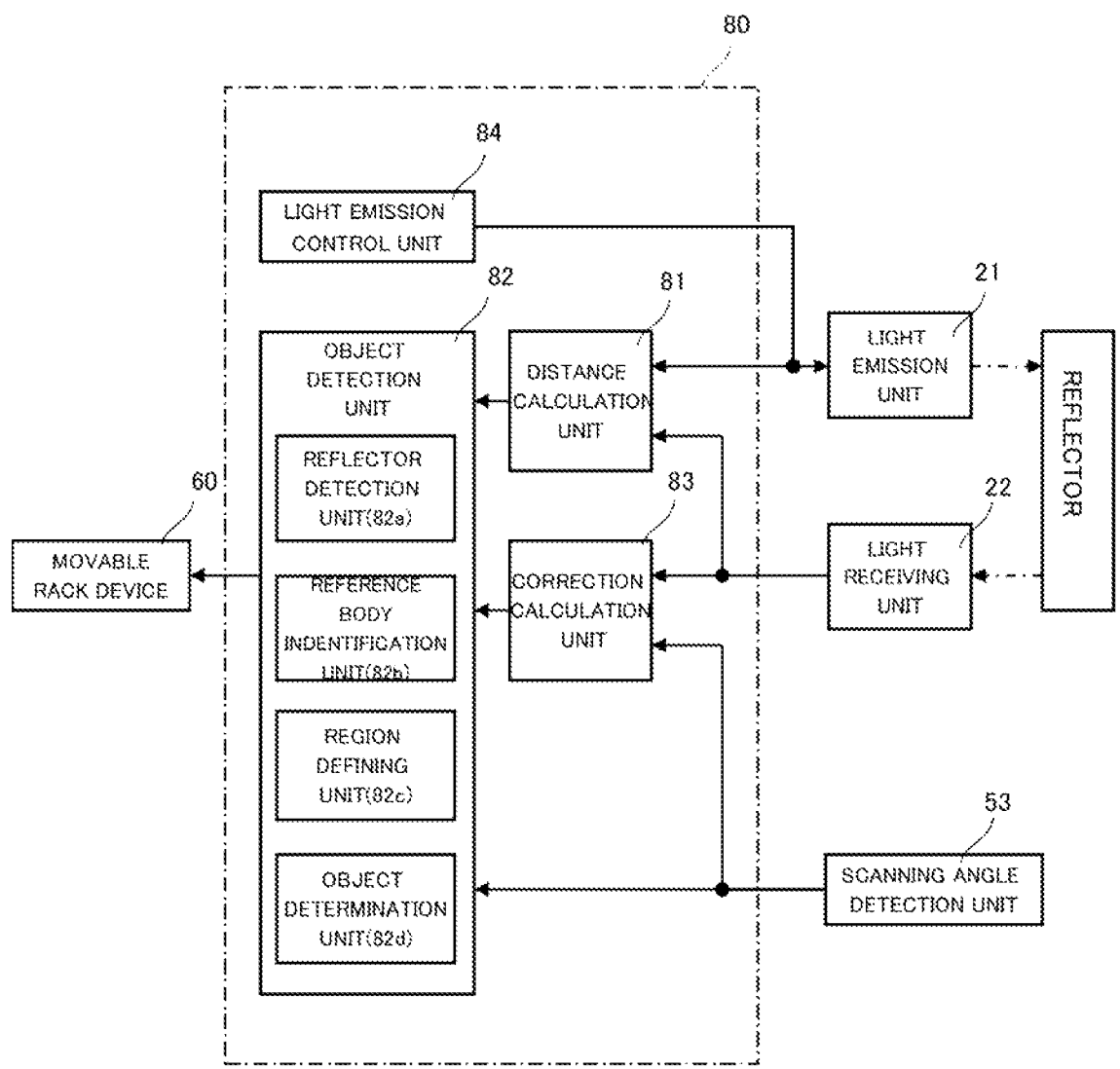
FIG. 3 is a functional block diagram of a controller built in the object detection device.

FIG. 3 illustrates a functional block configuration of the controller 80. The controller 80 includes a microcomputer, a digital signal processor, a memory, and other components. These components implement a light emission control unit 84 to control light emission timing of the light emission unit 21, a distance calculation unit 81 to calculate a distance to a detected object, based on physical characteristics of measurement light scanned by the optical scanning unit 23 and those of reflected light from the object (e.g., based on a time difference between emission time of the measurement light and detection time of the reflected light, or based on a phase difference between the measurement light and the reflected light), a correction calculation unit 83 to correct the distance calculated by the distance calculation unit 81, and an object detection unit 82.

A distance calculation method, called time-of-flight (TOF) method, is based on a time difference between measurement light and reflected light. In the TOF method, a distance d is calculated by the following expression 1, where C is the speed of light, and ΔT is a time difference.

$$d=(1/2)\times C\times \Delta T \qquad \text{[Expression 1]}$$

A distance calculation method, called amplitude modulation (AM) method, is based on a phase difference between measurement light and reflected light, with the measurement light from a light source being subjected to amplitude modulation at a predetermined modulation frequency. In the AM method, a distance d is calculated by the following expression 2, where φ is a measured phase difference, C is the speed of light, and F is a modulation frequency of the light source.

$$d=(1/2)\times (\varphi/2\pi)\times C/F \qquad \text{[Expression 2]}$$

The correction calculation unit 83 is a functional block to correct an error due to factors such as variation in components of the object detection device 20. The correction calculation unit 83 obtains a correction coefficient such that a distance calculated based on reflected light from a reference reflector 55, disposed on a portion of the inner wall of the upper casing 20B, is a predetermined distance.

The following description relates to an example of employing the TOF method, but is also applicable to the case of employing the AM method.

The object detection unit 82 includes a reflector detection unit 82a, a reference body identification unit 82b, a region defining unit 82c, and an object determination unit 82d.

The reflector detection unit 82a generates reflector information in which a distance from the object detection device 20 to a reflector calculated by the distance calculation unit 81 and corrected based on the correction coefficient obtained by the correction calculation unit 83, a scanning direction of the measurement light, and a reflected light intensity detected by the light receiving unit 22 are associated with each other. Specifically, the reflector information includes a reflected position of the measurement light (i.e., the distance and direction from the object detection device 20 to the reflector) and the reflected light intensity. This reflector information is detected, based on a scanning angle detected by the scanning angle detection unit (encoder) 53 and a distance calculated by the distance calculation unit 81 according to the scanning angle and then corrected with the correction coefficient calculated by the correction calculation unit 83 (hereinafter simply referred to as "distance calculated by the distance calculation unit 81"). The detected reflector information is stored in the memory.

Based on the reflector information detected by the light receiving unit 22 and the reflector detection unit 82a, the reference body identification unit 82b identifies whether the reflector is a predetermined reference body.

Based on the reflector information about the reference body identified by the reference body identification unit 82b, the region defining unit 82c defines an object detection region along the reference body.

The object determination unit 82d determines, as a target object, a reflector that is present within the object detection region defined by the region defining unit 82c and that is not identified as the reference body by the reference body identification unit 82b.

In the present embodiment, the aforementioned object detection device 20 is configured to emit the measurement light with a unit scanning angular resolution of 0.125 degrees, and to have a maximum detection distance of 20 meters and a maximum scanning angular range of 270 degrees.

[Configuration of a Device Incorporating the Object Detection Device]

Figure 4A:
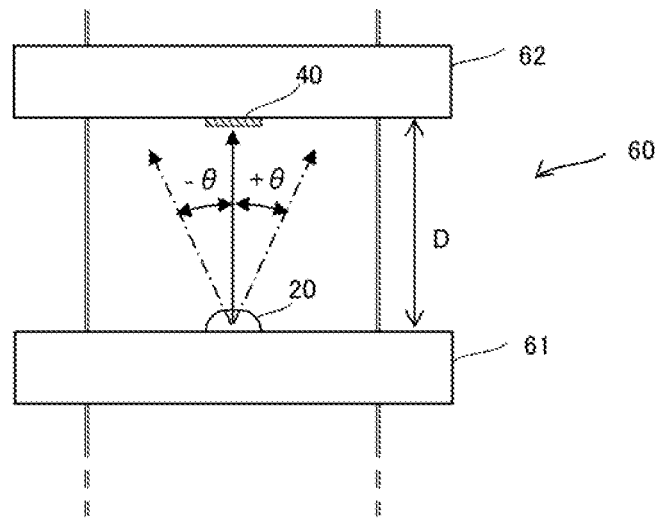
Figure 4B:
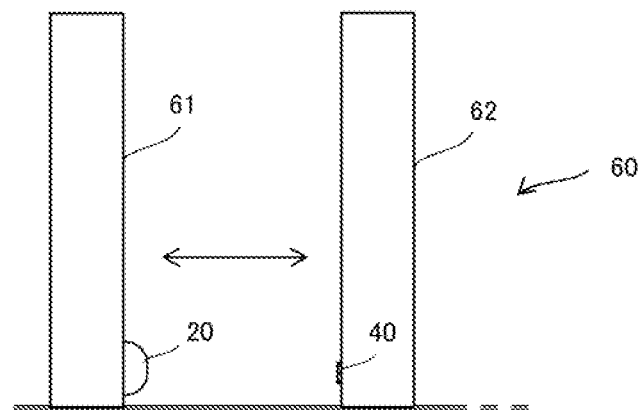

FIG. 4A is a plan view of major parts of a movable rack device 60, and FIG. 4B is a side view of the major parts of the movable rack device 60. The aforementioned object detection device 20 is installed at a lower center in a depth direction (a direction along a width of each rack) of one rack 61, and a reflective sheet as a reference body 40 is disposed on the opposing face of the other rack 62. The racks 61, 62 include, at their bottoms, motor-driven wheels movable along a pair of rails laid on the floor and drive circuits for controlling respective motors. The racks 61, 62 are configured to move relative to each other as the drive circuit is activated by an operation switch provided on a lateral side of each rack. While FIGS. 4A to 4C show the pair of racks 61, 62, more than one pair of racks is actually installed and configured to move relative to each other.

Each of the racks 61, 62 has individual storage sections on its front and back sides. By moving one of the racks 61, 62 to widen an intermediate space therebetween, a user can access opposing storage sections of the racks 61, 62.

If a third person moves one of the racks 61, 62 in a direction that narrows the intermediate space therebetween while a person or an object is present in the intermediate space, the person or the object may get caught in the intermediate space. Hence, to detect presence of any person or object in the intermediate space between the racks 61, 62, the object detection device 20 is installed on one of the racks 61, 62, and the reflective sheet as the reference body 40 is attached to the other.

Figure 4C:
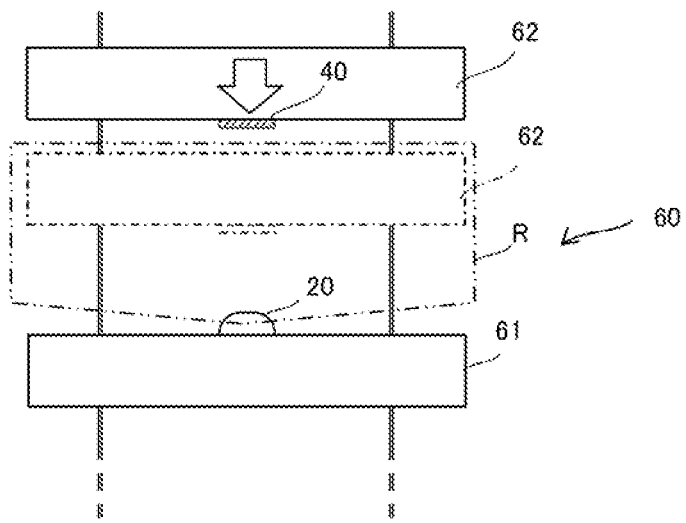

As shown in FIG. 4C, to detect presence of any person or object in the intermediate space between the racks 61, 62, the object detection device 20 sets a maximum object detection region R that covers a two-dimensional plane parallel to the floor when the intermediate space between the racks 61, 62 is maximum. However, if the object detection region R is static, the object detection device 20 may erroneously detect the rack 62 as a person or an object, for example, when the rack 62 is moving closer to the rack 61. Such erroneous detection may also happen when the rack 61 equipped with the object detection device 20 is moving closer to the rack 62 equipped with the reference body 40.

Thus, the object detection device 20 is configured to vary the object detection region R to appropriately detect presence of any person or object even during relative approaching movement of the racks 61, 62 toward each other. The object detection device 20 is also configured to vary the object detection region R during relative separating movement of the racks 61, 62 away from each other.

[Object Detection Region Setting and Object Detection Algorithms]

Figure 5:
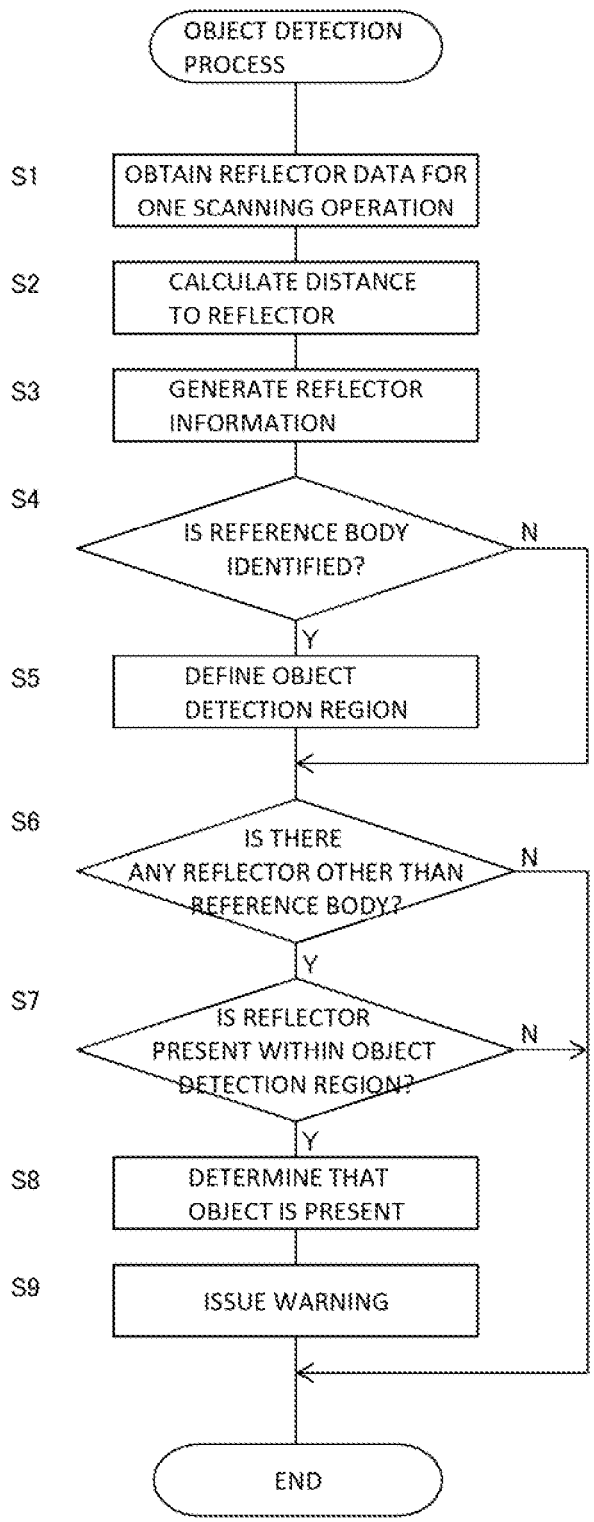
FIG. 5 is a flowchart of a procedure for setting an object detection region and detecting an object.

FIG. 5 illustrates a procedure for setting an object detection region and detecting an object. Measurement light is scanned in a measurement space (S1). Once the light receiving unit 22 receives reflected light corresponding to one scanning operation, the distance calculation unit 81 calculates a distance D from the object detection device 20 to each reflector (S2).

Based on the output from the distance calculation unit 81, the reflector detection unit 82a generates reflector information about each reflector, more specifically reflector information including a reflected light intensity, the distance D, and a scanning direction θ (swing angle with respect to the center; see FIG. 4A) about each reflector (S3). The reference body identification unit 82*b* identifies whether each reflector is the predetermined reference body 40 (S4). Upon identification of the reference body 40 (Y at S4), the region defining unit 82*c* defines an object detection region R along the reference body 40 (S5).

After the object detection region R has been defined, the object determination unit 82*d* determines whether the reflector information generated at step S3 includes information about a reflector other than the reference body 40 (S6). If such a reflector is present within the object detection region R (S7), the object determination unit 82*d* determines that there is an object (S8), and outputs the determination result to the drive circuit of the movable rack device 60 as a warning (S9). Based on the warning, the drive circuit of the movable rack device 60 stops or slows down the movement of the relevant movable rack.

Further description follows. When a distance calculated by the distance calculation unit 81 is continuously detected over a predetermined scanning angular range formed in adjacent scanning directions and a difference between detected distances is within a predetermined threshold, the reflector detection unit 82*a* determines presence of a reflector and generates the reflector information, i.e., the reflected light intensity, the distance D, and the scanning direction θ. This filtering process can exclude fine dust and bugs as noise.

The reference body identification unit 82*b* determines whether the reflector information is the one about the reference body 40, based on predetermined determination information. The predetermined determination information may include reflected light intensity, length along the scanning direction, scanning angle, etc. The reflected light intensity is employed to determine whether it is at or above a predetermined threshold. The length along the scanning direction is employed to determine whether it has a predetermined length corresponding to the reference body 40 along the scanning direction. The scanning angle is employed to determine whether it is within a predetermined scanning angular range. These pieces of determination information may be used individually or in combination.

Figure 6A:
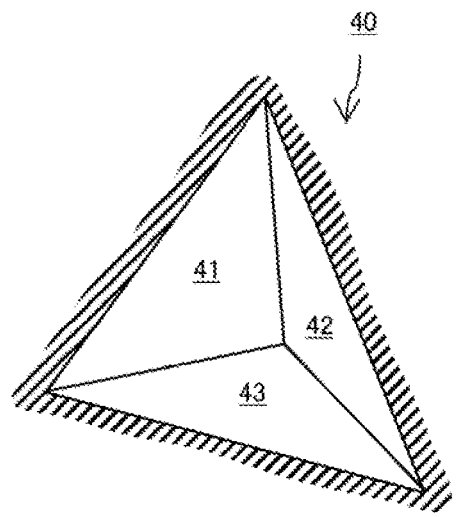
FIGS. 6A and 6B illustrate a retroreflective member used as a reference body.
Figure 6B:
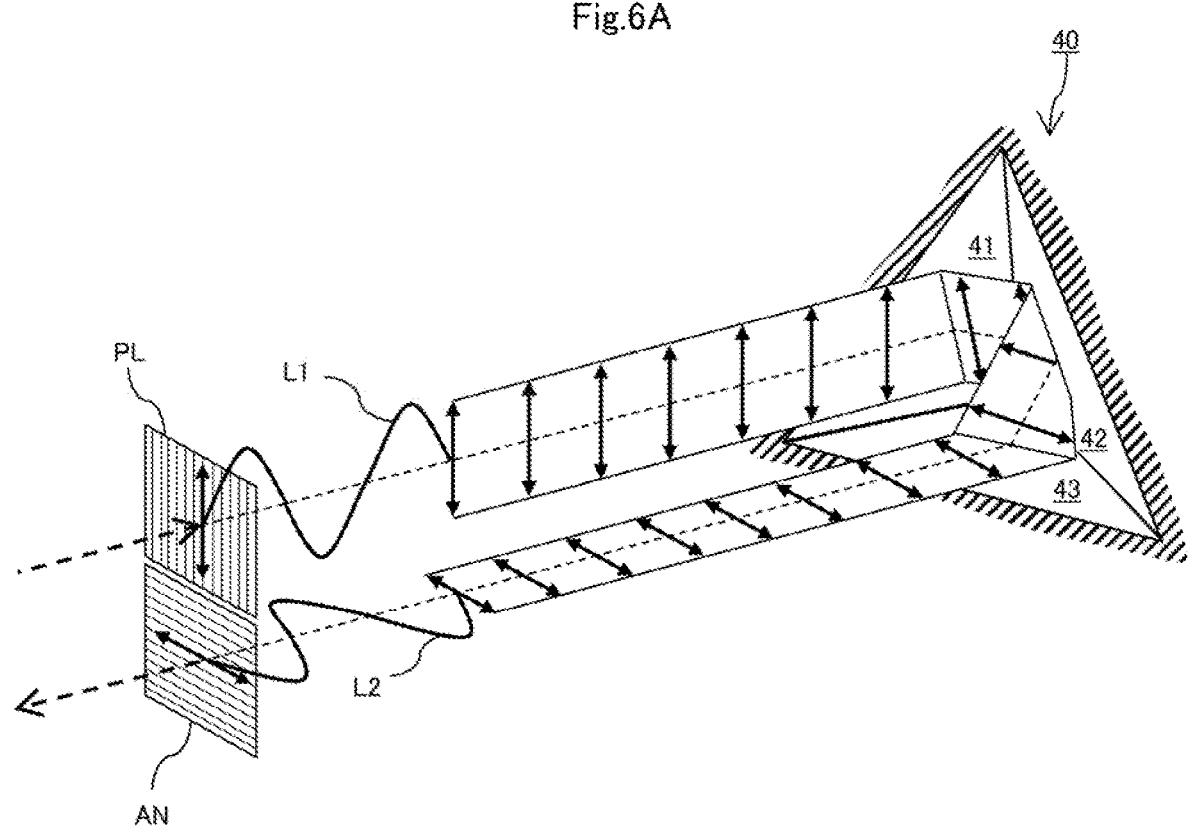

FIGS. 6A and 6B illustrate a retroreflective sheet as an example of the reference body 40. The retroreflective sheet has an array of trihedron cube corner elements (also called a microprism) each composed of three reflective mirrors 41, 42, 43 perpendicular to each other. Light incident on such a trihedron cube corner element is reflected in an incident direction, so that this reflected light has a much higher reflected light intensity than reflected light from ordinary scattering bodies.

Hence, by setting the threshold for the reflected light intensity to a value that represents the retroreflective sheet, it is possible to determine whether a reflector is the retroreflective sheet. Additionally, by specifying a length of the retroreflective sheet along the scanning direction, it is possible to identify, as the reference body 40, a reflector that maintains a reflected light intensity at or above a predetermined threshold over its length along the scanning direction.

Figure 7A:
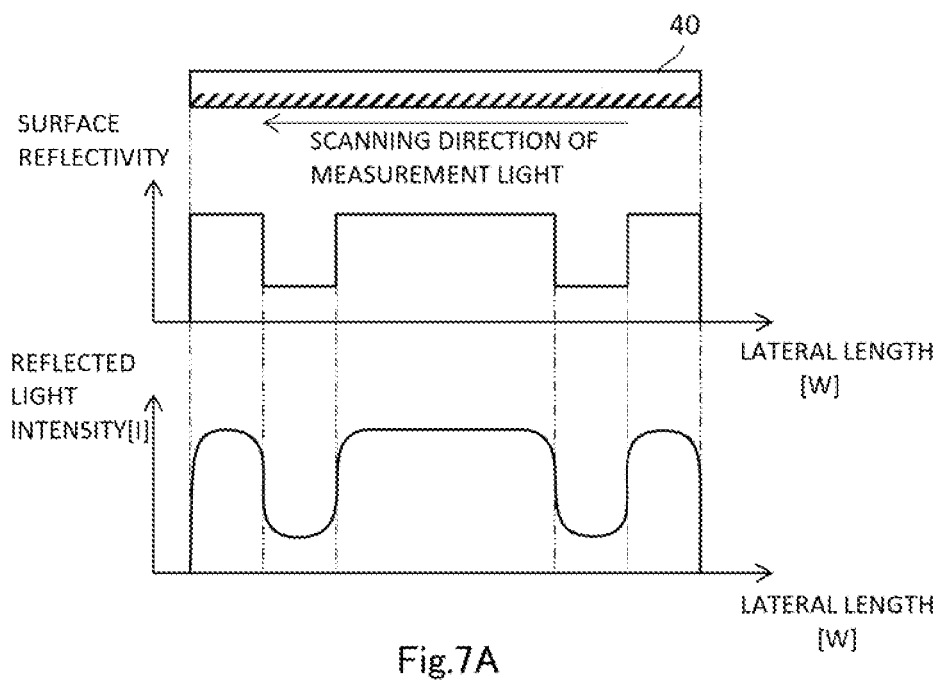
FIGS. 7A and 7B illustrate other examples of the reference body, showing reflection characteristics of the reference body.
Figure 7B:
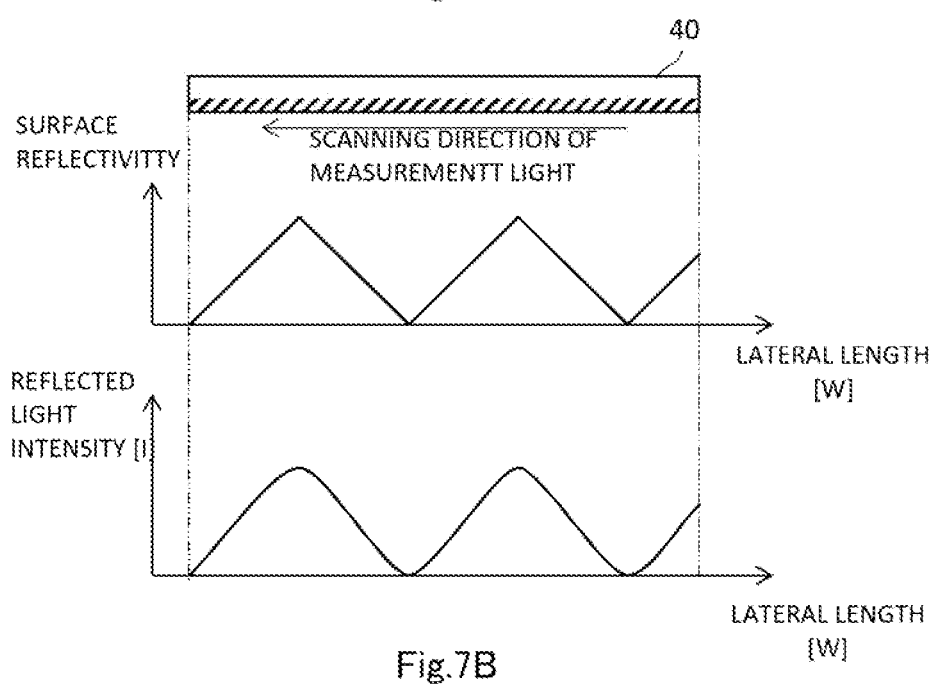

FIGS. 7A and 7B illustrate the case where the reference body 40 is a reflective sheet having reflection characteristics such that a reflected light quantity changes stepwise along the scanning direction of the measurement light.

By setting reflection characteristics of a reflective surface such that a reflected light quantity changes either stepwise or continuously along the scanning direction of the measurement light, it is possible to distinguish the reflective sheet highly accurately from other objects without such characteristics.

For example, as shown in FIG. 7A, the reference body may be a reflective sheet having a high surface reflectance at its ends and center and having a low surface reflectance between the center and each of the ends, along the scanning direction of the measurement light. Such a reflective sheet causes a reflected light quantity as detected by the light receiving unit 22 to change stepwise along the scanning direction, so that the reflected light from this reflective sheet can be reliably distinguished from reflected light from other objects. High and low intensity patterns like the above may be used to create coded information like barcodes, which enables easy identification of whether the detected object is the reference body and which also enables, in cases where there is a plurality of reference bodies, identification of each one of the reference bodies.

Alternatively, as shown in FIG. 7B, the reference body may be a reflective sheet having a surface reflectance that changes in a zigzag pattern along the scanning direction of the measurement light. Such a reflective sheet causes a reflected light quantity as detected by the light receiving unit 22 to continuously increase or continuously decrease along the scanning direction, so that the reflected light from this reflective sheet can be reliably distinguished from reflected light from other objects.

Still alternatively, the reference body may be a reflective sheet having reflection characteristics such that spectral reflection characteristics with respect to a wavelength of the measurement light change either stepwise or continuously along the scanning direction of the measurement light. In this case, the reflected light intensity, which is a piece of the determination information, contains a predetermined intensity change pattern that changes along the scanning direction.

Other than using the reflective sheets having the above-mentioned special reflection characteristics as the reference body 40, the reference body may be a continuous body. Specifically, presence of a continuous body is determined when reflected light is detected continuously along the scanning direction and the intensity and distance of the reflected light with respect to each scanning angle adjacent in the scanning direction are within respective predetermined thresholds. Also, when a plurality of continuous bodies is detected in one scanning operation and extended lines from each continuous body overlap each other, the plurality of continuous bodies constitute a single reference body.

Figure 9A:
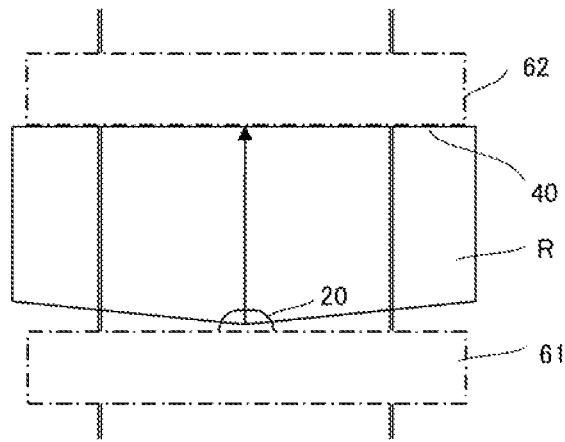
FIGS. 9A and 9B illustrate still another example of the reference body.

FIG. 9A shows one of such cases, in which the reference body 40 is the surface of the rack 62 itself, instead of the reference body 40 shown in FIGS. 4A and 4B. Specifically, a reflector that is continuous in a predetermined direction is recognized as the reference body. In the case shown in FIG. 9A, the predetermined direction refers to a direction that is parallel to the floor and perpendicular to an optical axis of measurement light having a swing angle θ of zero degrees (center). When a reflector is detected continuously over a predetermined length in the predetermined direction (e.g., about 80% of the length of the rack 62 in the depth direction), the reflector can be identified as the reference body 40.

For example, a person may be present between the movable racks 61, 62 and block the reflection from the surface of the rack 62. Even in this case, when lines connecting ends of reflectors except the reflector corresponding to that person can be superimposed as a single continuous line, such reflectors can be identified as the surface of the rack 62, namely as the reference body 40.

Figure 9B:
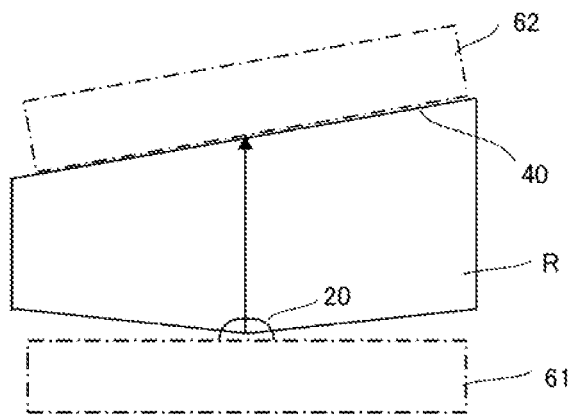

In the example shown in FIG. 9A, the predetermined direction is the direction parallel to the floor and perpendicular to the optical axis of the measurement light having a swing angle θ of zero degrees (center). However, the predetermined direction is not limited to this, and as shown in FIG. 9B, may be a direction that is parallel to the floor and along an inclined plane intersecting the optical axis of the measurement light having a swing angle θ of zero degrees (center), at a predetermined intersecting angle other than 90 degrees. The predetermined direction is set parallel to the floor because a scanning plane of the measurement light is parallel to the floor; the predetermined direction may not be parallel to the floor as long as the direction is parallel to the scanning plane of the measurement light.

The reference body 40 is not limited to a planar object and may be a curved object of any curvature. In this case, the reflector may be determined as the reference body 40 when reflected light is detected continuously along the scanning direction, the intensity and distance of the reflected light with respect to each scanning angle adjacent in the scanning direction are within respective predetermined thresholds, and line segments connecting each reflector have a predetermined curvature. This means that the predetermined determination information further includes curvature.

Figure 8A:
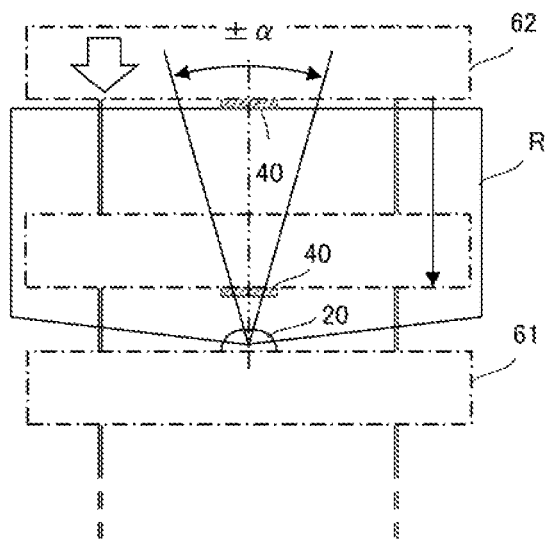
FIGS. 8A and 8B illustrate the reference body and a reference body detection range.
Figure 8B:
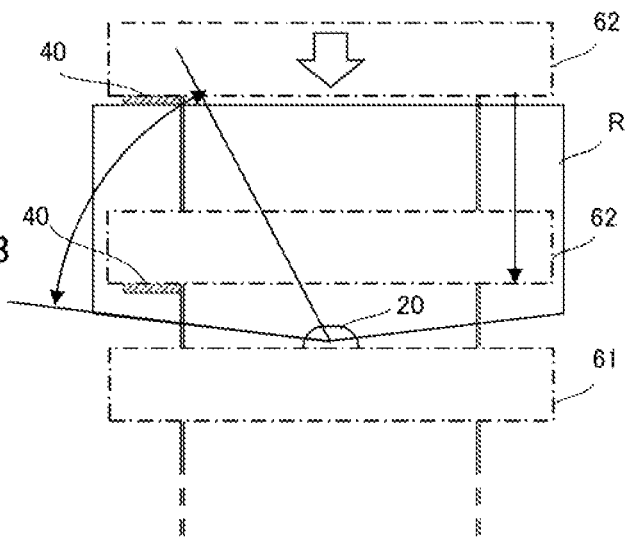

In the example shown in FIGS. 4A and 4B, the reference body 40 is disposed at the lower center of the rack 62 in the depth direction. Alternatively, the reference body 40 may be disposed either at the lower right end or lower left end of the rack 62 in the depth direction, as shown in FIG. 8B. Still alternatively, a plurality of reference bodies 40 may be disposed on a lower portion of the rack 62 at locations from the near side to the far side in the depth direction.

Objects having similar reflection characteristics to the reference body 40 should not be erroneously recognized as a reference body. It is thus preferable to limit the region for determination of the reference body 40 to a predetermined identification range. FIGS. 8A and 8B show examples of a scanning angle (scanning angular range) that is used as a predetermined identification range for the reference body identification unit 82b to determine whether a reflector is the reference body 40. For example, as shown in FIG. 8A, in a case where the center in the lateral width direction of the reference body 40 is positioned on the optical axis of the measurement light parallel to the floor and having a swing angle θ of zero degrees (center), an identification range may be set to an angular range of ±α degrees centered about the optical axis of the measurement light at zero degrees so that the entire area of the reference body 40 in the width direction can be detected at its remotest position from the object detection device 20. Even when an object having similar reflection characteristics to those of the reference body 40 is present outside the identification range, i.e., outside the scanning angular range of ±α degrees, the thus set identification range can prevent erroneous determination of such an object as the reference body 40.

For example, when the measurement light is scanned at an angular step of 0.125 degrees, the identification range may be set to a scanning angular range of ±10 steps. This identification range enables identification of the reference body 40 present within the range of ±1.25 degrees with respect to the optical axis of the measurement light having a swing angle θ of zero degrees (center).

Depending on the setting of the scanning angular range, the object detection device 20 may be unable to detect the entire area of the reference body 40 in the width direction when the reference body 40 is in proximity with the object detection device 20. Even in that case, a reflector that is detected continuously at least within the angular range of ±α degrees can be identified as the reference body 40.

In the example shown in FIG. 8B, the identification range is set to a wide scanning angular range regardless of a distance from the object detection device 20 to the reference body 40. The thus set identification range eliminates an influence of scanning angular deviation with respect to the reference body 40 that may be caused by changes in distance.

As described, even when the reference body 40 is in proximity with the object detection device 20, the scanning angular range may be set to detect the entire area of the reference body 40 in the width direction. Alternatively, the scanning angular range may be set variably based on a distance from the object detection device 20 to the reference body 40 in order to increase identification accuracy for the reference body 40. For example, the scanning angular range may be made narrower when the reference body 40 is remote from the object detection device 20 than when the reference body 40 is close to the object detection device 20. In other words, the reference body identification unit 82b identifies, as the reference body 40, a reflector present within the predetermined identification range that is narrower than the scanning range of the measurement light. The identification range is not limited to the scanning angular range alone, and may be set to any shape formed by combining the scanning angular range and the distance.

Figure 10A:
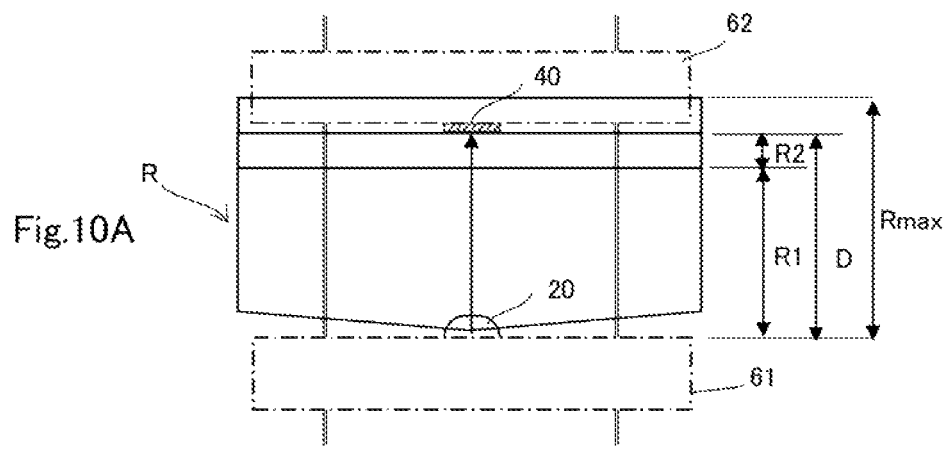
FIGS. 10A to 10C illustrate the reference body and an object detection region.
Figure 10B:
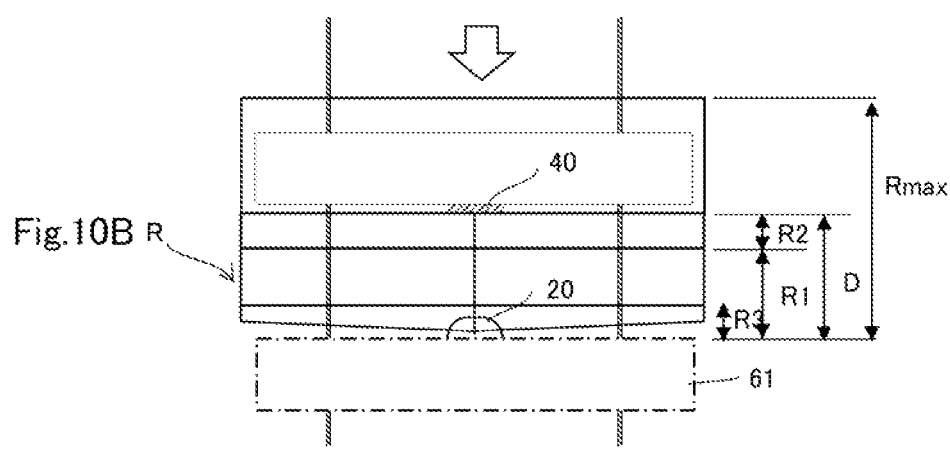

FIGS. 10A and 10B illustrate an object detection region R defined by the region defining unit 82c, taking the movable rack device 60 as an example. The region defining unit 82c dynamically defines the object detection region R at least along the reference body 40, in a space between the object detection device 20 and a structure mounted with the reference body 40, with the object detection device 20 being provided to a structure that is movable relative to the reference body 40 so as to move toward and away from the reference body 40. The object detection region R at least includes a plane along a direction in which a plane of the reference body 40 extends. As the object detection region R includes the plane along the direction in which the planar reference body 40 extends, the plane of the reference body 40 in its extending direction does not overlap the object detection region R. Consequently, it is possible to prevent erroneous detection of the plane of the reference body 40 in its extending direction as an object.

An object detection region when the rack 62 is at the far end from the rack 61 is defined as an object detection region Rmax. The region defining unit 82c identifies the approaching distance D from the rack 62 to the rack 61 based on the reference body 40, and defines an object detection region R1 ranging from the object detection device 20 along the extending direction of the reference body 40. The object detection region R1 is narrower than the object detection region Rmax. With respect to the space between the racks 62, 61 as viewed from the object detection device 20, the object detection region R does not need to encompass the entire areas beyond the right and left ends of these racks. Accordingly, the object detection region R encompasses an area that extends slightly longer to the far side and the near side than the length of the racks 61, 62 in the depth direction.

The object detection region R1 is preferably given a predetermined offset R2 toward the object detection device 20, based on the distance from the object detection device 20 to the reference body 40. In this case, the offset R2 takes a negative value so that the object detection region R1 is shorter than the distance to the reference body 40.

Depending on characteristics of the reflective surface of the reference body 40, there may be an error in the distance D detected by the reflector detection unit 82*a*, which may result in erroneous detection of the reference body 40 as an object within the object detection region R. Even in this case, the predetermined offset R2 given toward the object detection device 20 based on the distance to the reference body 40 ensures that the reference body 40 is excluded from the object detection region R1. The value of the offset R2 may be set appropriately, as a function of variations in distance measurement, surface unevenness of the rack 62, and other parameters.

Preferably, the object detection region R1 includes a predetermined fixed region R3 that is defined in a portion thereof close to the object detection device 20, regardless of the distance D from the object detection device 20 to the reference body 40. When the reference body 40 comes near the object detection device 20, the thus defined fixed region R3 prevents the object detection region R from being unnecessarily narrowed, and consequently ensures a predetermined minimum required space between the racks 61, 62.

Figure 10C:
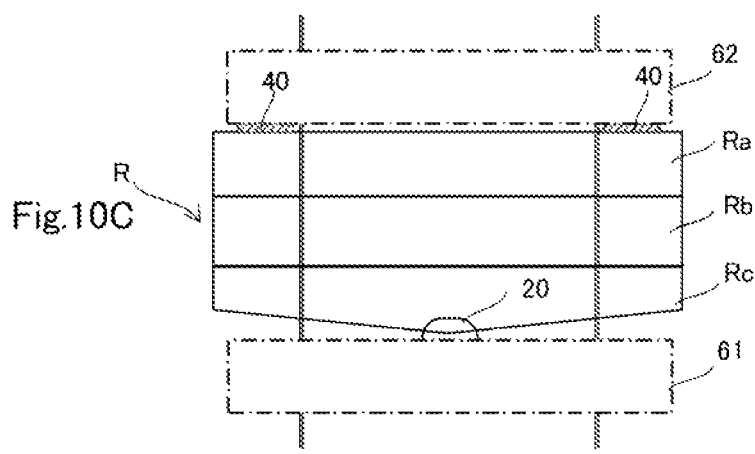

As shown in FIG. 10C, it is preferable that the object detection region R1 be divided into subregions according to the distance from the object detection device 20 and that object detection information be output to external devices, such as the movable rack device 60, for each of these divided regions Ra, Rb, Rc. This enables appropriate measures depending on the divided region where a person or an object is detected: whether to stop the movement of the rack 62 immediately or to merely slow down the movement of the rack 62 to prompt the person to leave the region. In FIG. 10C, two reference bodies 40 are provided on the rack 62 on the near side and the far side along the depth direction.

Alternatively, the region defining unit 82*c* may define a plurality of object detection regions RA, RB, RC at least partially overlapping each other, where the region RA corresponds to the three regions Ra, Rb, Rc, the region RB corresponds to the two regions Rb, Rc, and the region RC corresponds to the region Rc.

In this case, the object determination unit 82*d* is preferably configured to switch between a first determination mode and a second determination mode when a target object is present in any of the object detection regions RA, RB, RC and in their overlapping regions. The object determination unit 82*d* under the first determination mode determines that the target object is present in each one of overlapping regions. The object determination unit 82*d* under the second determination mode determines that the target object is present only in a particular one of the overlapping regions. The switching operation may be enabled by means of a switch provided at the object detection device 20, or a setting device, such as a computer, connected to the object detection device 20. Also, the object determination unit 82*d* may be configured to switch between the first determination mode and the second determination mode for each of the object detection regions RA, RB, RC.

Under the first determination mode, for example, when a target object is present in the object detection region Rc, the object determination unit 82*d* determines that the target object is present in all of the object detection regions RA, RB, RC. When a target object is present in the object detection region Rb, the object determination unit 82*d* determines that the target object is present in the object detection regions RA, RB.

Under the second determination mode, for example, when a target object is present in the object detection region Rc, the object determination unit 82*d* determines that the target object is present only in the object detection region RC. When a target object is present in the object detection region Rb, the object determination unit 82*d* determines that the target object is present only in the object detection region RB.

When a target object is present in overlapping regions, the object determination unit 82*d* under the second determination mode determines presence of the target object by giving a higher priority to an object detection region closer to the object detection device 20. This mode is preferred in a case where different measures are required when the target object is close to the object detection device 20 and when the target object is remote from the object detection device 20. For example, when a target object is present only in the object detection region Ra, the rack is caused to move at a slightly reduced speed. When a target object is present only in the object detection region Rb, the rack is caused to move at a greatly reduced speed. When a target object is present only in the object detection region Rc, the rack is stopped.

This configuration enables determination of presence of a target object to be made only in a required region, which can reduce a calculation load for the determination processing. Additionally, this configuration enables appropriate control of the rack movement according to individual situations.

FIG. 14 illustrates exemplary outputs when the first determination mode and the second determination mode are switched for each of the object detection regions RA, RB. In FIG. 14, the first determination mode and the second determination mode are respectively denoted as "first mode" and "second mode".

The above embodiment is based on the assumption that the reference body identification unit 82*b* identifies a predetermined reference body. In actual use environments, however, the reference body identification unit 82*b* may be in some cases unable to identify a predetermined reference body due to various factors, such as noise from external light and a large intrusive object covering the reference body.

To deal with such cases, the object determination unit 82*d* preferably has a non-detection output mode. When the reference body identification unit 82*b* is unable to identify the reference body present in the measurement space, the object determination unit 82*d* under the non-detection output mode determines that a target object is present in an object detection region regardless of the presence or absence of the reflector. The non-detection output mode may be enabled and disabled by means of a switch provided at the object detection device, or a setting device, such as a computer, connected to the object detection device 20.

In cases where the predetermined reference body cannot be identified, the non-detection output mode allows the object determination unit 82*d* to determine that a target object is present in an object detection region. This in turn enables appropriate safety measures, such as to stop or slow down the movement of the rack.

In addition to the above embodiment, the optical scanning mechanism 23 built in the object detection device 20 may further include a polarizer that is disposed in the optical path of measurement light and configured to only transmit light polarizing in a first direction, and an analyzer that is disposed in the optical path of reflected light and configured to only transmit light polarizing in a second direction perpendicular to the first direction.

Figure 12:
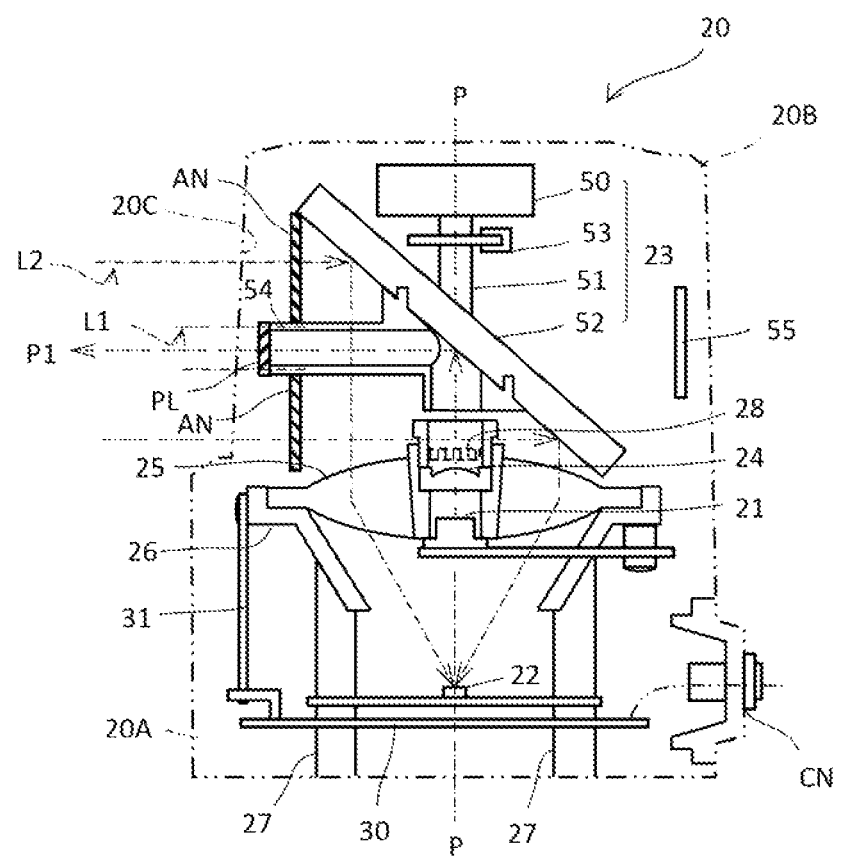
FIG. 12 illustrates an internal structure of the object detection device in accordance with another embodiment.

As shown in FIG. 12, the polarizer PL and the analyzer AN are located on the light guide unit 54 of the optical scanning mechanism 23 facing the optical window 20C, the polarizer PL being disposed at an outlet end of the measurement light optical path L1, and the analyzer AN being disposed at an inlet end of the reflected light optical path L2. That is, the polarizer PL is disposed inside the light guide unit 54 while the analyzer AN is disposed outside the light guide unit 54. Also, a quarter-wave plate 28 as an example of a circular polarizing plate is disposed immediately next to the projection lens 24 in the light emission direction.

The laser diode of the light emission unit 21 emits measurement light that is linearly polarized in a predetermined direction. The measurement light turns into circularly polarized light by passing through the quarter-wave plate 28. Further, by passing through the polarizer PL, the circularly polarized light turns into linearly polarized light, for example, in a direction perpendicular to the scanning direction.

For example, the polarizer PL and the analyzer AN may be a wire grid made of fine metal wires on a glass substrate or a crystalline material that can adjust polarized components by utilizing its own birefringence phenomenon.

An optical member disposed on the reflective surface of the reference body 40 to turn a polarization direction by 90 degrees causes a 90-degree rotation of a polarization direction of the reflected light relative to a polarization direction of the measurement light. For such an optical member, preferable use is made of the aforementioned retroreflective sheet having an array of trihedron cube corner elements or a half-wave plate.

As shown in FIG. 6B, measurement light is linearly polarized in the vertical direction by passing through the polarizer PL, and is reflected on the three faces of the trihedron cube corner element to have its polarization direction rotated by 90 degrees. Then, the linearly polarized light passes through the analyzer AN.

Even when the measurement light that has passed through the polarizer PL is reflected on a metal plate of aluminum or the like, the reflected light does not change its polarization direction and hence does not pass through the analyzer AN. When the measurement light that has passed through the polarizer PL is reflected on a white scattering plate, the measurement light has its polarization direction disturbed and turns into reflected light composed of an overlap of circularly polarized light and differently angled linearly polarized light. As a result, the quantity of reflected light passing through the analyzer AN is almost halved.

As the optical scanning mechanism 23 includes the polarizer PL and the analyzer AN, which rotate together with the deflection mirror 52, no changes occur in the polarization direction of the measurement light emitted for scanning and in the polarization direction of the incident reflected light. The reflective surface of the capture target which is the reference body having such reflection characteristics that cause a 90-degree rotation of the polarization direction of the measurement light can ensure reliable identification of the capture target.

Figure 13:
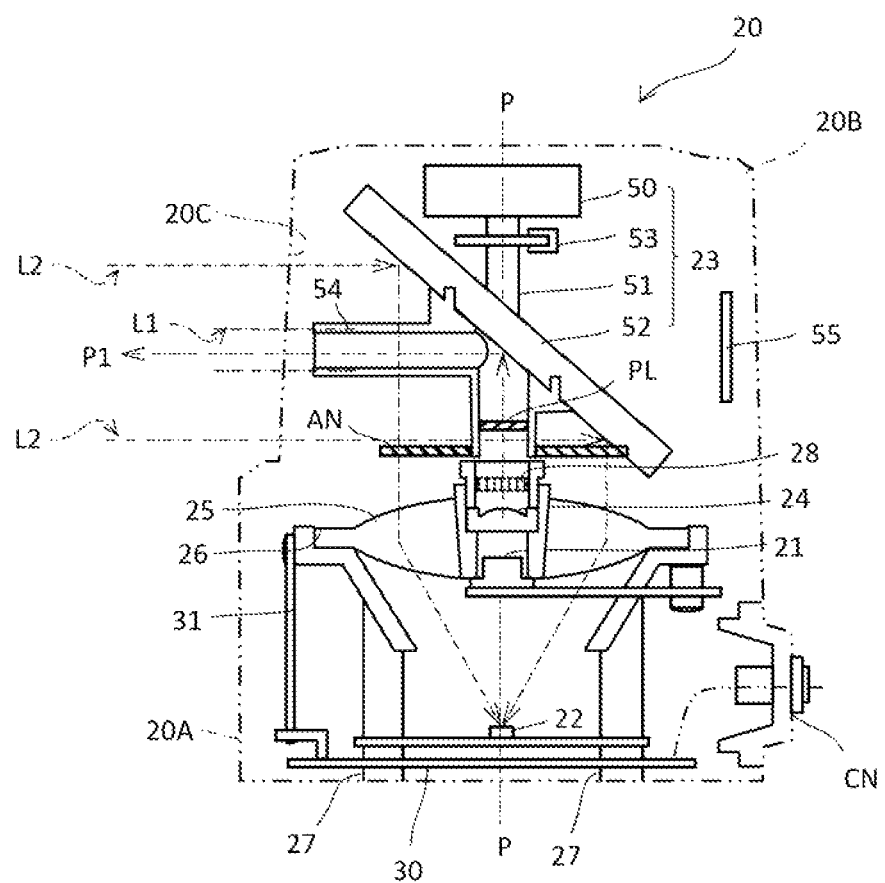
FIG. 13 illustrates an internal structure of the object detection device in accordance with still another embodiment.

FIG. 13 illustrates another example of the optical scanning mechanism 23 of the object detection device 20. The aforementioned polarizer PL and the aforementioned analyzer AN are located on the light guide unit 54 of the optical scanning mechanism 23 facing the light emission unit 21, the aforementioned polarizer PL being disposed at an inlet end of the measurement light optical path L1, and the aforementioned analyzer AN being disposed at an outlet end of the reflected light optical path L2 for reflected light deflected by the deflection mirror 52.

Figure 11:
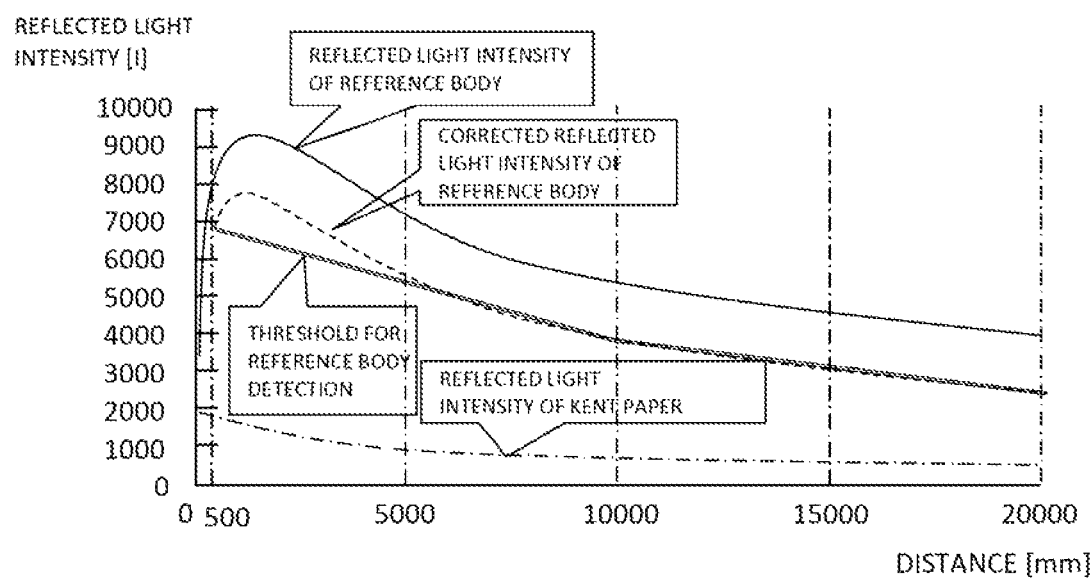
FIG. 11 illustrates reflected light intensity characteristics.

FIG. 11 illustrates reflected light intensity characteristics in the case where the object detection device 20 shown in FIG. 2 detects the retroreflective sheet (reference body) shown in FIG. 6 (the characteristics for the reference body are shown by a solid line in FIG. 11). The quantity of detected reflected light increases as the reference body approaches the object detection device 20. However, this quantity sharply drops once the reference body comes in close proximity to the object detection device 20 because most of the reflected light from the reference body for the measurement light emitted from inner side of the light guide unit 54 is incident on inner side of the light guide unit 54 and a reduced quantity of light is incident on the deflection mirror 52. The quantity of reflected light from Kent paper, which is white standard paper, greatly differs from that from the reference body, as shown by a dash-dotted line in FIG. 11.

Hence, a reflected light quantity threshold for determining whether reflected light is from the reference body is set as follows: based on the reflected light intensity characteristics (shown by a dashed line in FIG. 11) obtained by uniformly subtracting a certain value from the reflected light intensity characteristics shown by the solid line, the threshold is represented by a line segment connecting the intensity at the distance of 500 mm (immediately before the sharp drop in intensity) and the intensity at the intermediate distance of 10000 mm, and a line segment connecting the intensity at the intermediate distance of 10000 mm and the intensity at the remote distance of 20000 mm. This threshold is used to determine whether a reflector is the reference body.

It will be readily understood that the threshold may be modified as appropriate based on the reflected light detection characteristics of the object detection device 20 and the reflection characteristics of the reference body.

In the above embodiment, the object detection device 20 scans the measurement light two-dimensionally along the plane parallel to the floor. In an alternative embodiment, the object detection device 20 may be configured to scan the measurement light two-dimensionally along a plane vertical to the floor. Such scanning can detect dangerous conditions, such as the possibility of a person or an object getting caught by an automatic gate having doors that open and close automatically in the horizontal or vertical direction, and can prevent such accidents from actually happening.

The object detection device 20 may also be configured to scan the measurement light three-dimensionally such that the object detection device 20 can define a three-dimensional object detection region R between the object detection device 20 and a reference body disposed in a three-dimensional space. For example, the object detection device 20 shown in FIG. 2 may be rotatably mounted on a structure around a rotation axis perpendicular to the optical axis P and may thereby scan the measurement light three-dimensionally.

While the object detection device 20 built into the movable rack device and the reference body 40 have been discussed in the above embodiment, the object detection device 20 may be built into other devices than movable rack devices; the object detection device 20 can be used for any device that is required to avoid dangerous conditions by detecting intrusion of any person or object into a space between the device and a moving body movable relative to the object detection device 20. For example, the object detection device 20 may be mounted on a forklift and may be used for monitoring of the dead angle behind the driver, specifically a space between the forklift and structures behind the forklift, such as walls and racks. The object detection device 20 may also be mounted on an automatic guided vehicle (AGV) or the like.

In the above embodiment, the region defining unit defines an object detection region based on a detected reference body. Even in cases where an object detection region is preset, the object determination unit 82d can be also configured to switch between the first determination mode and the second determination mode.

Specifically, the object detection device for detecting an object in a measurement space may include: the optical scanning unit configured to scan measurement light emitted from the light emission unit in a measurement space and to guide reflected light from a reflector for the measurement light to the light receiving unit; a reflector detection unit configured to detect reflector information, the reflector information including a distance from the object detection device to the reflector calculated based on physical characteristics of the measurement light and the reflected light, a reflected light intensity detected by the light receiving unit, and a scanning direction of the measurement light; a region defining unit configured to define the plurality of object detection regions that at least partially overlaps each other; and the object determination unit configured to determine whether a target object is present in any one of the overlapping object detection regions, based on the reflector information detected by the reflector detection unit. The object determination unit may be configured to switch between the first determination mode and the second determination mode, the object determination unit under the first determination mode determining that the target object is present in all of the overlapping regions, the object determination unit under the second determination mode determining that the target object is present only in a particular one of the overlapping regions.

In this case, there is no need to identify whether a reflector detected by the reflector detection unit is the reference body described in the above embodiment, and all reflectors are target objects. Hence, an object detection region is not defined based on the reflector information about the reference body, but is preset. While the reflector information includes a distance from the object detection device to the reflector, the reflected light intensity detected by the light receiving unit, and the scanning direction of the measurement light, the purpose of using the reflected light intensity is not to identify the reference body, but merely to ensure that the intensity of reflected light is at or above a threshold that eliminates noise light. Therefore, the reflector information may exclude the reflected light information on condition that noise light can be eliminated by preprocessing.

The embodiment described above is merely exemplary and in no way intended to limit the technical scope of the present invention. It will be readily understood that modifications may be made as appropriate to specific configurations of the respective units to the extent that such modifications ensure the advantageous effects of the present invention.

REFERENCE SIGNS LIST

20 Object detection device
21 Light emission unit
22 Light receiving unit
23 Optical scanning mechanism
24 Projection lens
25 Light receiving lens
23, 24, 25 Optical scanning unit
82 Object detection unit
82a Reflector detection unit
82b Reference body identification unit
82c Region defining unit
82d Object determination unit

The invention claimed is:

1. An object detection device for detecting an object in a measurement space, the device comprising:
   an optical scanning unit configured to scan the measurement space by measurement light emitted from a light emission unit and to guide reflected light from a reflector for the measurement light to a light receiving unit; and
   a processor configured to:
      detect reflector information, the reflector information including a distance from the object detection device to the reflector calculated based on physical characteristics of the measurement light and the reflected light, a reflected light intensity detected by the light receiving unit, and a scanning direction of the measurement light;
      identify whether the reflector is a predetermined reference body, based on the reflector information;
      define an object detection region between the device and the reference body, based on the reflector information about the reference body; and
      determine, as a target object, the reflector that is present in the object detection region defined by the region defining unit and that is not identified as the reference body; wherein
   the object detection device is provided on a side of a first structure, the reference body is provided on a side of a second structure facing the side of the first structure, and the first and the second structures are movable along a first direction relative to each other, and
   the processor is further configured to dynamically change the object detection region based on relative movement along the first direction.

2. The object detection device according to claim 1, wherein
   the processor is further configured to identify a reflector present within a predetermined identification range that is narrower than a scanning range of the measurement light.

3. The object detection device according to claim 1, wherein
   the object detection region has a predetermined offset toward the object detection device, based on a distance from the object detection device to the reference body.

4. The object detection device according to claim 1, wherein
   the object detection region includes a predetermined fixed region that is defined in a portion of the object detection region close to the object detection device, regardless of a distance from the object detection device to the reference body.

5. The object detection device according to claim 1, wherein
   the reference body is composed of a planar body, and
   the object detection region at least includes a plane along a direction in which a plane of the reference body extends.

6. The object detection device according to claim 1, wherein
   the processor is further configured to define a plurality of object detection regions that at least partially overlaps each other, and the processor is further configured to switch between a first determination mode and a second determination mode in a case where the target object is present in any one of the overlapping object detection regions, the processor under the first determination mode determining that the target object is present in each one of the overlapping regions, and the processor under the second determination mode determining that the target object is present only in a first one of the overlapping regions.

7. The object detection device according to claim 1, wherein the processor has a non-detection output mode, the processor under the non-detection output mode determining, when processor is unable to identify the reference body in the measurement space, that the target object is present in the object detection region regardless of presence or absence of the reflector.

* * * * *